(12) United States Patent
Nielsen et al.

(10) Patent No.: US 9,182,260 B2
(45) Date of Patent: Nov. 10, 2015

(54) FLOW METER WITH PROTRUDING TRANSDUCERS

(71) Applicant: Kamstrup A/S, Skanderborg (DK)

(72) Inventors: Søren Tønnes Nielsen, Solbjerg (DK); Peter Schmidt Laursen, Skanderborg (DK); Jens Lykke Sørensen, Beder (DK)

(73) Assignee: KAMSTRUP A/S, Skanderborg (DK)

( * ) Notice: Subject to any disclaimer, the term of this patent is extended or adjusted under 35 U.S.C. 154(b) by 44 days.

(21) Appl. No.: 14/346,177

(22) PCT Filed: Sep. 19, 2012

(86) PCT No.: PCT/DK2012/050346
§ 371 (c)(1),
(2) Date: Mar. 20, 2014

(87) PCT Pub. No.: WO2013/041104
PCT Pub. Date: Mar. 28, 2013

(65) Prior Publication Data
US 2014/0216167 A1    Aug. 7, 2014

(30) Foreign Application Priority Data
Sep. 23, 2011    (EP) .................................. 11182505

(51) Int. Cl.
*G01F 1/66*    (2006.01)

(52) U.S. Cl.
CPC    *G01F 1/66* (2013.01); *G01F 1/662* (2013.01); *G01F 1/667* (2013.01)

(58) Field of Classification Search
CPC ........................................................ G01F 1/66
USPC ............................................. 73/861.28, 861.27
See application file for complete search history.

(56) References Cited

U.S. PATENT DOCUMENTS 5,159,838 A * 11/1992 Lynnworth ..................... 73/644
5,515,733 A *  5/1996 Lynnworth ................ 73/861.27
(Continued)

FOREIGN PATENT DOCUMENTS

CN        201795820 U    4/2011
DE    10 2007 011 547 A1    9/2008
(Continued)

OTHER PUBLICATIONS

European Search Report for EP 11 18 2505 dated Dec. 20, 2011.
(Continued)

*Primary Examiner* — Jewel V Thompson
(74) *Attorney, Agent, or Firm* — Knobbe Martens Olson & Bear LLP

(57) ABSTRACT

The invention relates to an ultrasonic flow meter arranged to measure a flow rate of a liquid, the flow meter comprises a flow tube 2, optionally a measurement insert, and two or more ultrasonic transducers 8 which are arranged in transducer inserts 20 to be inserted into the flow tube through openings in the flow tube. The transducer inserts are formed monolithically with the housing as a part of the bottom of the housing. The transducer inserts are in a mount position inserted through the openings in the flow tube to extend into the flow passage so that the surface 15 of the transducer inserts protrude into the flow passage. In this manner, gas bubbles, such as air bubbles, released from the flowing liquid will not rest in front of the transducer insert irrespectively of the orientation of the flow meter in the pipe installation.

12 Claims, 4 Drawing Sheets

(56) References Cited

U.S. PATENT DOCUMENTS

| | | | |
|---|---|---|---|
| 6,058,786 | A | 5/2000 | Wallén et al. |
| 6,508,134 | B1 | 1/2003 | Feller |
| 6,584,862 | B1 * | 7/2003 | Molenaar ............... 73/861.27 |
| 6,799,475 | B2 | 10/2004 | Van Klooster |
| 7,973,453 | B2 * | 7/2011 | van Klooster ............. 310/334 |
| 2005/0087025 | A1 | 4/2005 | Moscaritolo et al. |
| 2007/0227263 | A1 | 10/2007 | Fukano et al. |
| 2010/0011867 | A1 * | 1/2010 | van Klooster et al. ......... 73/644 |

FOREIGN PATENT DOCUMENTS

| | | |
|---|---|---|
| EP | 1 967 828 A1 | 9/2008 |
| WO | WO 2007/020375 A1 | 2/2007 |

OTHER PUBLICATIONS

International Search Report for PCT/DK2012/050346 dated Mar. 1, 2013.

* cited by examiner

FLOW METER WITH PROTRUDING TRANSDUCERS

CROSS REFERENCE TO RELATED APPLICATIONS

This application is a U.S. National Phase Application of PCT International Application Number PCT/DK2012/050346, filed on Sep. 19, 2012, designating the United States of America and published in the English language, which is an International Application of and claims the benefit of priority to European Patent Application No. 11182505.5, filed on Sep. 23, 2011. The disclosures of the above-referenced applications are hereby expressly incorporated by reference in their entireties.

FIELD OF THE INVENTION

The present invention relates to an ultrasonic flow meter arranged to measure a flow rate of a liquid, and in particular to a flow meter which is not sensitive to air bubbles attaching to the transducers during operation when mounted in a pipe installation.

BACKGROUND OF THE INVENTION

In an ultrasonic flow meter, ultrasonic transducers emit ultrasonic signals into a flowing medium in order to measure the flow rate, or other parameters, of the flowing medium. Flowing liquids may contain gas bubbles, in particular air bubbles, which are continuously released from the liquid and into the pipe system. The released air bubbles reside in the pipe system as air pockets in cavities of the pipe system for a period of time until they are flushed away by the flowing liquid.

Ultrasonic flow meters installed in a pipe system may provide cavities in which released air can rest for a period of time. Air pockets in the pipe system need not be a problem, however for ultrasonic flow meters there is a risk that the air pockets interfere with the ultrasonic signal path and thereby interfere with the measurement and affect the accuracy. This is particularly a problem if the transducers reside at the highest point in the flow passage, since the space in front of the transducers may provide a cavity in which air can rest and adhere to the transducers.

In most compact flow meters, that is flow meters where the control electronics are mounted directly on the flow part, the control electronics as well as the display are positioned on the top side of the transducers. To avoid problems with gas bubbles that are caught in front of the transducers, the flow meter is rotated so that the transducers are moved away from the area of the highest point. However this results in that the display is also rotated away from a vertical view. Flow meters are installed in a variety of tube installation. In many situations, optimal visibility of the display would be achieved with a display pointing vertically upwards.

EP 1 967 828 A1 discloses a flow meter with a holding mechanism for a display which can be attached to a flow tube to ensure that the transducers are tilted away from the area of the highest point to avoid problems with air bubbles, while the display can be mounted in a horizontal plane to ensure a vertical viewpoint. While the problem with air bubbles is solved, the solution requires an elaborate holding mechanism.

DE 10 2007 011 547 A1 discloses, in FIG. 5, a flow meter where two transducers are inserted into the central area of the flowing fluid with opposing surfaces, since air bubbles by virtue of gravitation seek the top most part of the flowing fluid, such a flow meter construction would not have problems with air bubbles attaching to the transducers, irrespective of orientation of the flow tube. However, fabrication and mount of the transducer inserts is a difficult task.

WO 2007/020375 A1 discloses a flow meter where the transducers are mounted outside a bending flow tube, so that two transducer surfaces oppose each other in the central area of the flowing fluid. Such a flow meter construction would not have problems with air bubbles attaching to the transducers, irrespective of orientation of the flow tube. However, the meter construction requires a bend flow tube, opposing transducers and electrical connection of the transducers in the form of wires attached to the transducers and lead to the control electronics.

SUMMARY OF THE INVENTION

It would be advantageous to achieve an alternative to known flow meters which does not suffer from air bubbles attaching to the transducers, and which is cost-effective to manufacture. In general, the invention preferably seeks to mitigate, alleviate or eliminate one or more of the above mentioned disadvantages singly or in any combination. The present invention provides an ultrasonic flow meter that is arranged to measure a flow rate of a liquid, the flow meter comprises:

a through-going flow tube arranged for passage of a liquid between an inlet and an outlet, the flow tube defines a centre axis between the inlet and the outlet, the flow tube defines a flow passage either by an inner wall of the flow tube itself, by an inner wall of a measurement insert inserted into the flow tube or by a combination of the inner wall of the flow tube and a measurement insert;

a housing for liquid tight mounting on the flow tube, the housing comprises two or more ultrasonic transducers and a control circuit arranged for operating the transducers and for generating a signal or value indicative of the flow rate of the liquid, the housing further comprises two or more transducer inserts formed monolithically with the housing as a part of the bottom of the housing;

the two or more transducers being arranged in the transducer inserts; each transducer comprises a surface for emission and receipt of ultrasonic signals, the surface defines a surface normal, and wherein the transducer is arranged so that the surface normal is perpendicular to the centre axis, and wherein the transducer insert comprises a coupling surface arranged in a plane parallel manner to cover the surface of the transducer;

wherein the housing in a mount position is arranged so that the transducer inserts are inserted through openings in the flow tube to extend into the flow passage in a manner so that the coupling surfaces of each transducer insert is positioned so that the entire coupling surface is placed inside an inner cross-section of the inner wall.

The invention thus provides an ultrasonic flow meter of the type with a straight flow tube between the inlet and the outlet of the flow meter where the transducer inserts are inserted into the flow, and where the sound generating and receiving surfaces of the transducers are plane parallel with each other, as well as with a plane containing the centre axis. Thus the transducers are perpendicular to the flow direction. With such a type of flow meter, the plane of the transducers, the plane of electronic circuit board(s) and the display plane can all be plane parallel in a stacked manner. Such a stacking of the important components is highly desirable from an automation point of view in connection with fabrication. Moreover by arranging the ultrasonic transducers and the control circuit inside a housing which can be assembled as a subassembly and mounted onto the flow tube as a single unit, a flow meter which supports a highly cost-efficient manufacturing process is provided. With a coupling surface which protrudes into the flow passage, air bubbles released from the liquid will not rest at, and adhere to, the coupling surface, but seek towards the highest point in the flow passage, and thereby away from the ultrasonic signal passage. The present invention provides a flow meter which is cost-efficient to manufacture which can be installed in all orientations, including an orientation with vertical transducers, without requiring a minimum flow to ensure constant flush of air bubbles, but remain unaffected of air bubbles even in situations of low flow or zero flow. The display and further electronic circuits can be provided in the same housing and in the same plane as the transducers without requiring a specific orientation of the flow meter.

In embodiments, the ultrasonic flow meter may be, or may be part of, a charging consumption meter, e.g. a water meter, heat meter, cooling meter, or energy meter, where the consumption meter is arranged for measuring consumption data of a supplied utility used as a basis for billing. The consumption meter may be used in connection with household water supply, district heating or district cooling. The consumption meter may be a legal meter, i.e. a meter which is subdued to regulatory demands. Such regulatory demands may be demands to the precision of the measurements.

Further advantageous embodiments of the invention are disclosed in the description of the embodiments.

BRIEF DESCRIPTION OF THE DRAWINGS

Embodiments of the invention will be described, by way of example only, with reference to the drawings, in which.

DESCRIPTION OF EMBODIMENTS

Figure 1:
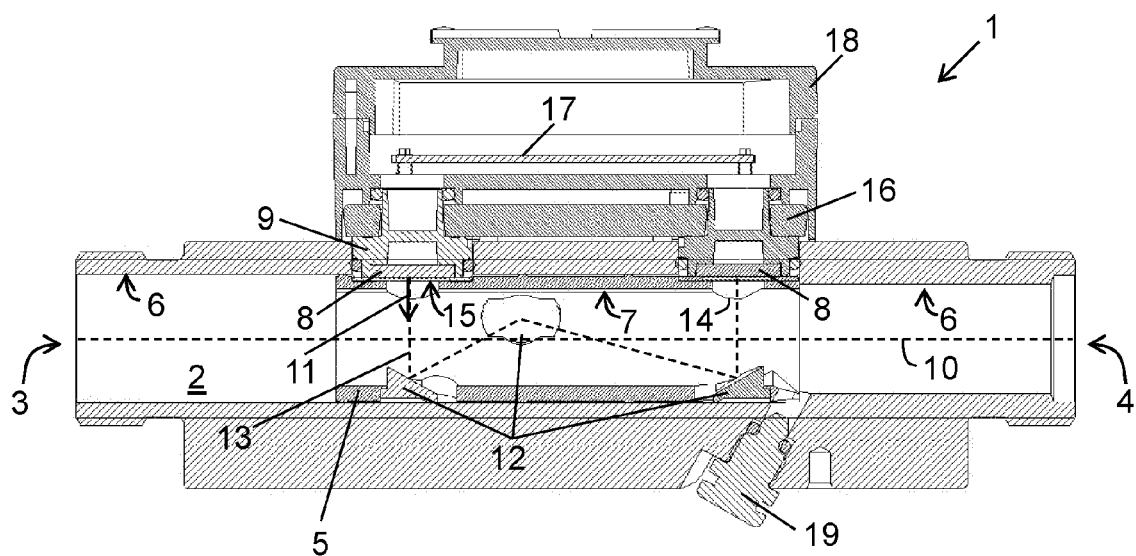
FIG. 1 illustrates a schematic cross-sectional view of an ultrasonic flow meter.

FIG. 1 illustrates an ultrasonic flow meter 1 known in the art. The figure illustrates the flow meter in a schematic cross-sectional view.

The flow meter comprises a through-going flow tube 2 arranged for passage of a liquid between an inlet 3 and an outlet 4, the flow tube defines a centre axis 10 between the inlet and the outlet. The flow tube comprises a measurement insert 5 which is inserted into the flow tube from one of the ends. The measurement insert is a plastic holder holding a number of mirrors 12, here three, for directing the ultrasonic signal 13 from an emitting transducer 8, through the flow tube to the receiving transducer 8. The flow tube defines a flow passage with an inner wall. The inner wall is defined by a combination of the inner wall 6 of the flow tube itself and an inner wall 7 of the measurement insert inserted into the flow tube.

The flow meter comprises two ultrasonic transducers 8, each being arranged in separate transducer inserts 9 which are inserted into the flow tube through openings in the flow tube. The transducers are normally monolithic piezoelectric transducers of a ceramic material, such as lead zirconate titanate (PZT) based transducers. Each transducer comprises a surface for emission and receipt of ultrasonic signals, the surface defines a surface normal 11. The transducers are arranged in a plane parallel manner so that the surface normal of the transducers are perpendicular to the centre axis 10, the centre axis being parallel with the flow direction. To protect the piezoelectric material from direct contact with the flowing liquid, the transducer insert comprises a coupling surface 15 arranged in a plane parallel manner to cover the surface of the transducer. The coupling surface is normally the surface of a protective metal membrane covering the transducer or the surface of a protective plastic layer covering the transducer. The coupling surface is the surface separating the transducer insert from the flowing medium, through which the signal is transmitted from the flowing medium to the transducers.

In FIG. 1, the transducer unit is inserted into the flow tube in a manner so that the coupling surface is at the same level as the inner wall 6 of the flow tube. To avoid attenuation of the ultrasonic signal, the measurement insert is provided with opening in the area of the transducer, here illustrated by a thin contour line 14. In this manner, the ultrasonic signals should not penetrate the wall of the measurement insert.

In a situation of use, if the flow meter is mounted vertically, gas bubbles, typically in the form of air bubbles, in the flowing liquid risk getting trapped in the openings of the measurement insert, and thereby in front of the transducer. This is a problem since air bubbles in front of the transducer will severely deteriorate the ultrasonic signal and thereby lower the measuring accuracy. To avoid such trapped air bubbles, a known solution in the art is to mount the flow meter in the piping installation in a rotated manner, so that the coupling surface is rotated away from the highest point, and the risk of trapped air bubbles is lowered considerably, in particular in a situation of at least moderate flow.

The transducer inserts 9 are fixed to resist the pressure of the flowing liquid. This may in embodiments be done by means of a plate 16 which is mounted to fix the transducer inserts. The transducers may together with control electronics 17, here in the form of a PCB, be confined within a casing or housing 18. In the illustrated figure, only a single PCB is shown, however other circuit boards may be present inside the casing, together with further electronic elements, such as a display, a communication circuit, etc. Also a temperature probe plug 19 is illustrated. In general, a temperature probe need not be present. For example a water meter for measuring the consumption of water would normally not use a temperature probe, and a temperature probe plug would not be present.

The ultrasonic flow meter of embodiments of the present invention is a transit time flow meter arranged to measure a flow rate of a liquid flowing in the flow passage 2 by use of the known operation principle for transit time flow meters, where ultrasonic signals are emitted at one transducer and received at the other transducer, and where the difference in time-of-arrival between oppositely propagating signals is measured and converted into a flow rate. The piezoelectric transducers are operated by the control circuit 17, which based on the involved signals generate a signal or value indicative of the flow rate of the liquid. The level of signal treatment of the control circuit may vary from basic signal treatment, where processed signals are output to a further electronic unit for further signal processing, to a complete signal treatment resulting in the determination of the flow rate. Such further electronic unit may be part of the flow meter unit as in the embodiment of FIG. 2, or may be part of a separate calculator circuit (not shown) communicatively connected to the control circuit of flow meter.

Aspects of the flow meter have been described in connection with FIG. 1, which presents a solution of the prior art. Nevertheless the general aspects are also relevant to embodiments of the present invention.

The flow meter of FIG. 1 requires a number of steps in order to mount the final flow meter. The transducer inserts are separately manufactured as sub-assembly units, and are separately mounted onto the flow tube. After positioning the transducer inserts are firmly fasten by mount of the holder plate 16 or other means, and subsequently the electronics are mounted in a manner so that an electric connection is obtained between electronic circuitry 17 inside the housing and the piezo electronic transducers 8.

Figure 2:
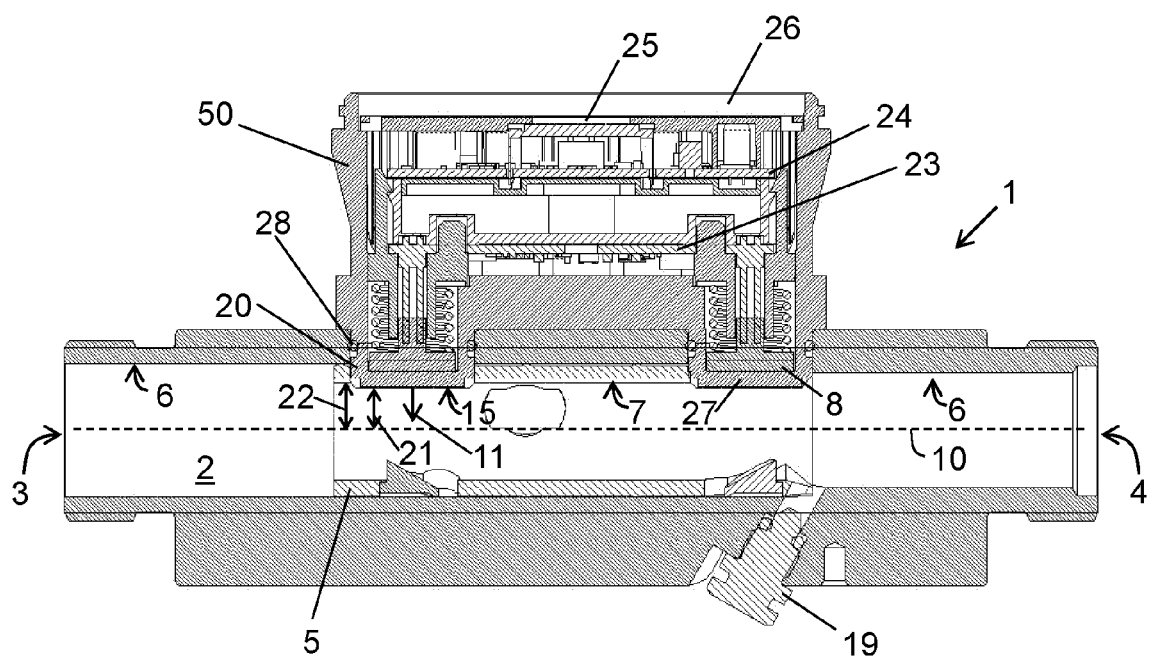
FIG. 2 illustrates a schematic cross-sectional view of an ultrasonic flow meter in accordance with an embodiment of the present invention.

FIG. 2 illustrates an embodiment in accordance with the present invention, which can be manufactured in a more cost-efficient manner, and which provides a solution which is rotationally insensitive, e.g. it allows for vertical installation of the flow meter without risking that air bubbles in a flowing liquid get trapped in front of the transducers.

This is obtained by a flow meter 1 where the transducer inserts 20 are formed monolithically with the housing or housing 50 as a part of the bottom of the housing. That is the transducer inserts are integrated as a part of the housing. In this manner, the transducer inserts are mounted together with the housing in matching openings in the flow tube. In the mount position, the transducer inserts 20 are inserted into the flow tube, to extend or protrude into the flow passage 2. In a situation of use, where a flowing liquid is present, the coupling surface 15 is submerged into the flowing liquid. Thus, the transducer inserts 20 are formed so that the distance 21, parallel with the surface normal 11, between the centre axis 10 and the coupling surface 15 is smaller than a distance 22, again parallel with the surface normal 11, between the centre axis 10 and the inner wall 6, 7 of the flow passage in a position abutting the edge of the openings in the flow tube for inserting the transducer insert, that is in a position just next to the opening in the flow tube.

Figure 3:
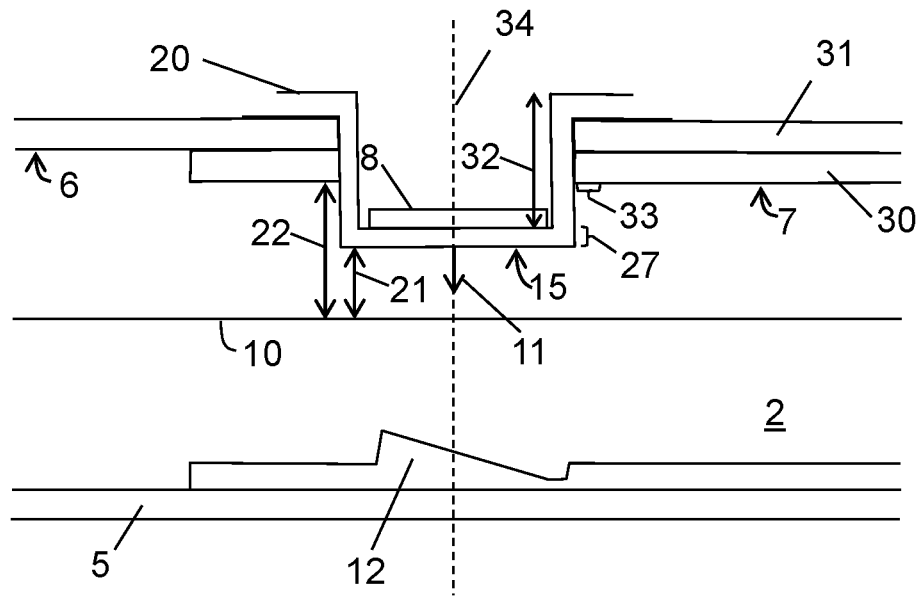
FIGS. 3 and 4 illustrate the geometric aspects of the protruding transducers in a schematic manner.
Figure 4:
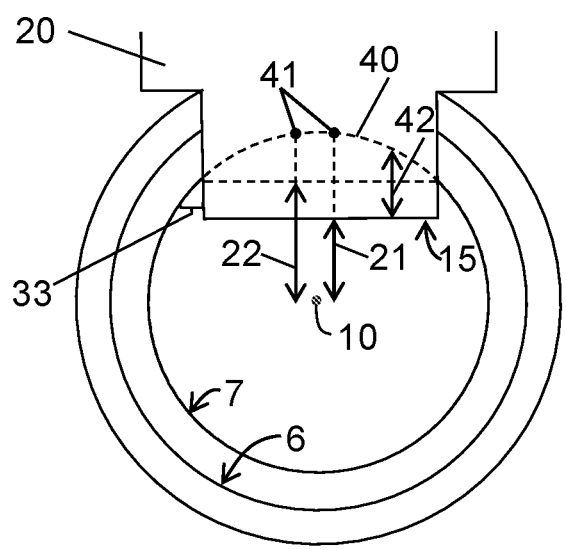

FIGS. 3 and 4 illustrate geometric aspects of the protruding transducers in a schematic manner. In FIG. 3, a protruding transducer is schematically illustrated in the same cross-sectional plane as FIG. 2, whereas FIG. 4 schematically illustrates a protruding transducer in the transversal plane.

FIG. 3 illustrates the wall 31 of the flow tube 2 with inner wall 6, and the wall 30 of the measurement insert 5 with inner wall 7. The measurement insert holds a mirror 12. The transducer insert 20 is mounted in an opening of the flow tube. The transducer insert holds the transducer 8. On an overall functional level, the transducer insert is formed so that it protrudes into the flow passage so that gas bubbles in a liquid in the flow tube 2 will not rest at the coupling surface 15 in a situation of vertically mounted transducers. This may be achieved by ensuring a proper depth 32 of the transducer insert. The proper depth may be expressed as distances along the surface normal 11 of the coupling surface 15. The distance 21 is defined as the distance parallel with the surface normal between the coupling surface and the centre axis 10. The distance 22 is defined at the distance parallel with the surface normal between the inner wall 7 of the flow passage and the centre axis in a position abutting the edge of the openings in the flow tube for inserting the transducer insert. The centre axis is taken as the centre with respect to the inner wall of the flow tube 2. Generally, in a situation of a vertical oriented transducer, gas bubbles will not rest at the coupling surface 15 if the distance 21 is smaller than the distance 22.

With the teaching of the present invention in mind, the skilled person is capable of performing the necessary tests to determine an appropriate depth 32 of the transducer insert. However, in embodiments the coupling surface should be at least 1 mm from the area abutting the edge of the transducer insert. That is the difference between the distance 22 and the distance 21 should be at least 1 mm.

In embodiments, it may be beneficial to ensure that the distance parallel between the centre axis and the coupling surface is smaller than the distance between the centre axis and the inner wall in an extended region 33 abutting and surrounding the edge of the openings. This so-called extended region is in embodiments at least 0.5 mm broad.

FIG. 4 is similar to FIG. 3, however for a schematic cross-sectional view along the line 34 of FIG. 3, but without the mirror 12 inserted. The distances 21 and 22 have been displaced from the centre for illustrative reasons.

FIG. 4 illustrates a transducer insert in the mount position where they are inserted through the openings in the flow tube to extend into the flow passage in a manner so that the coupling surfaces 15 of each transducer insert is positioned so that the entire coupling surface 15 is placed inside the inner cross-section 40 of the inner wall 7 in the area of the opening of the transducer insert. In the illustrated embodiment, the inner wall 7 is defined by a measurement insert and the inner cross-section of the inner wall is the inner cross section of the measurement insert. In a situation without a measurement insert, the cross-section of the inner wall would be the inner cross-section of the flow tube itself.

The transducer insert is positioned so that the coupling surface 15 is placed inside the inner cross-section 40 of the inner wall 7. This can be expressed as the distance 21 between the centre axis and the coupling surface is smaller than the distance between the centre axis and the corresponding point 41 on the inside cross-section of the inner wall for the entire coupling surface. The distance 42 between a point on the inner cross-section and the coupling surface, in the direction towards the centre of the flow tube, is thus always positive.

Figure 5:
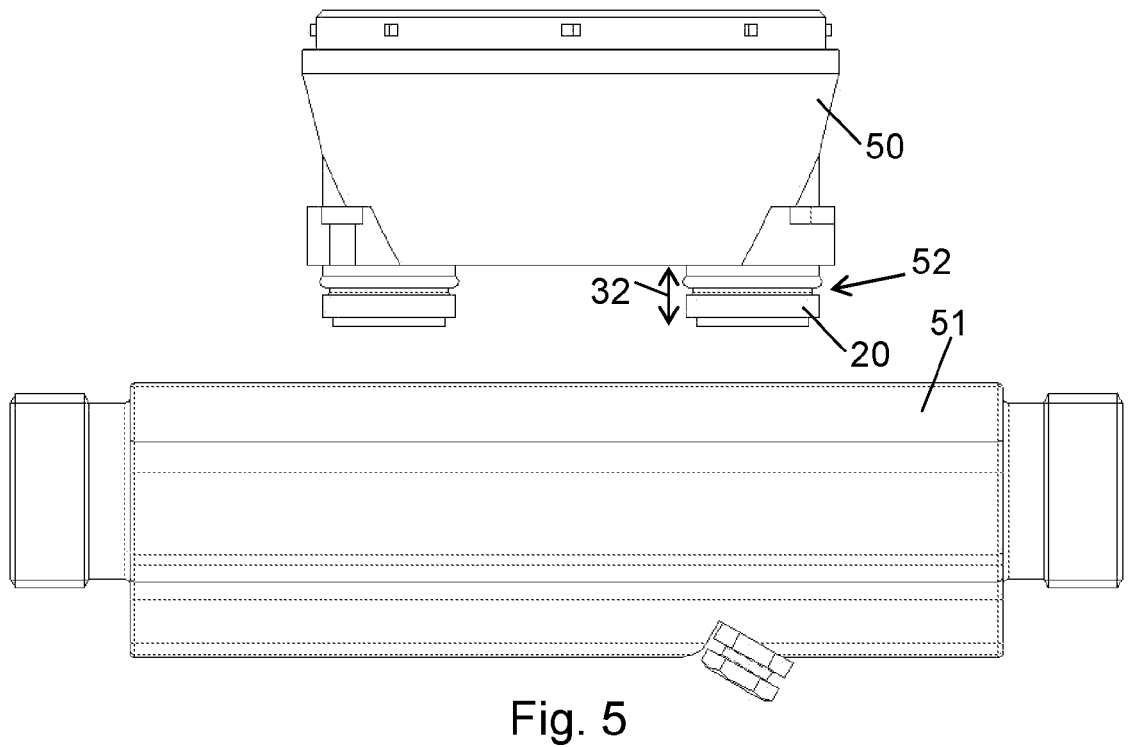
FIG. 5 illustrates a side view of a cup shaped housing separated from the flow tube.

FIG. 5 illustrates a side view of the cup shaped housing 50 separate from a flow tube 51.

The housing 50 illustrated in the embodiments of FIG. 2 and FIG. 5 is formed as a monolithic entity which is mounted as a unit onto the flow tube 51, the housing is cup-shaped. The flow tube 51 may be made from either a polymeric material or formed in metal, such as a brass alloy or stainless steel. In the embodiment of FIG. 2 and FIG. 5, the monolithic cup-shaped housing may be cast in a polymeric material. Examples of suitable polymer materials for the housing are: PPS, PES, PPE, a PS compound, or PA12, which in addition to providing a low moist permeability is also strong enough to provide a structure that does not break due to mechanical forces applied to the structure when it is rigidly mounted in a piping installation. In further embodiment, the polymer material may be a composite material, i.e. based on a polymer and another type of material, such as carbon, glass or the like. In an embodiment, the housing is cast in one piece.

The transducer inserts 20 are formed monolithically with the housing 50, as part of the bottom of the housing. The housing is to be mounted and fasten as a unit on the flow tube in a liquid tightly manner. This is in the illustrated embodiment (FIGS. 2 and 5) obtained by use of a sealing means, here in the form of O-rings 28, arranged between the housing and the flow tube. The O-ring is not illustrated in FIG. 5 instead seats 52 for the O-rings are shown. Sealing means can also be placed at different areas between the housing and the flow tube.

Returning to FIG. 2, the transducers 8 are protected from direct liquid contact by the bottom wall of the transducer insert, the bottom wall thus forms a coupling layer 27 with the coupling surface 15. Springs are provided inside the transducer inserts to press the transducers firmly towards the backside of the coupling layer. The thickness of the wall of the coupling layer covering the surface of the transducer is typically matched to the wavelength of the ultrasonic signal in order to ensure optimal coupling of the ultrasonic signal through the wall. The coupling layer, together with the side walls of the transducer inserts, forms a water-tight barrier with the coupling surface being in contact with any liquid flowing in the flow tube.

The housing moreover comprises a control circuit in the form of a populated PCB 23 arranged for operating the transducers and to generate a signal or value indicative of the flow rate of the liquid. However, in addition to the control circuit 23, also a calculator circuit 24 and a display 25 are present inside the housing, which is covered by a lid 26.

In the illustrated embodiment, the housing is cup-shaped with an inner cavity which is provided with only a single opening which is arranged with means for sealed connection by a cover. Since the transducer inserts are formed monolithically with the housing as a part of the bottom of the housing, the sealing of the lid is the only seal needed is to seal off the cavity, and thereby any electronic equipment provided in the enclosure of the cavity, from the surroundings.

The illustrated embodiments all comprise a measurement insert. The present invention is directed to flow meters of the type where the transducer surface is perpendicular to the flow direction, thus reflectors are needed in order to direct the signal along or against the flow. In the illustrated embodiments, the reflectors are provided as mirrors attached to a measurement insert. In general the reflectors may also be attached directly to the flow tube or formed on the inside of the flow tube. Therefore in general, the presence of a measurement insert is optional. Moreover, the measurement insert may hold other numbers of mirrors than three, in particular two mirrors, one in each end may be used. However, embodiments with more than three mirrors may be envisioned.

In an embodiment where the flow meter comprises a measurement insert, the edge of at least one of the transducer inserts, in the mounted position, advantageously lock the measurement insert in at least one direction parallel with the centre axis. This is seen in FIGS. 2 and 3, where the two transducer inserts are inserted into opening of the measurement insert, so that the edge of each transducer insert interacts with the edge of the openings of the measurement insert and thereby locks the measurement insert in the direction of the flow as well as in the rotational direction along the circumference of the inner wall. The measurement insert may in embodiments be locked in position by a combination of stops provided in the inner wall of the flow tube and at least one of the transducer inserts.

Figure 6:
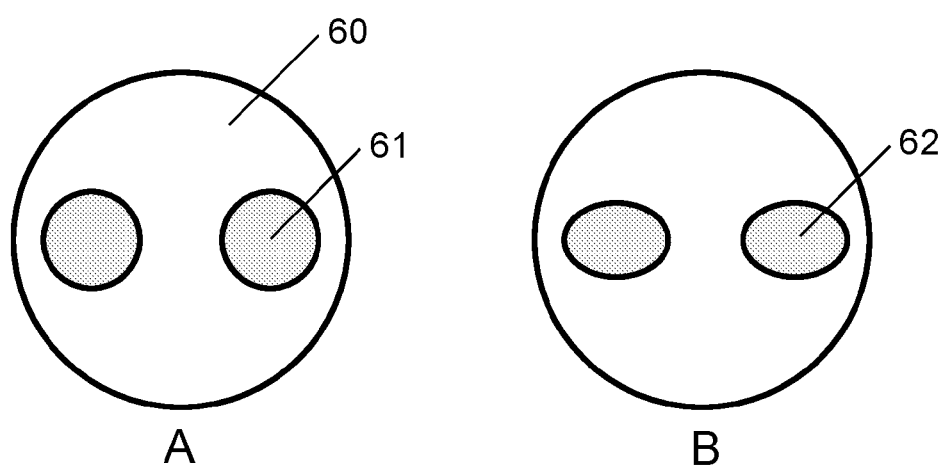
FIG. 6 schematically illustrates the bottom of a cup similar to the cup of FIGS. 2 and 5.

FIG. 6 schematically illustrates the bottom 60 of a cup similar to the cup 50 of FIGS. 2 and 5 with the general cross-sectional shape of the transducer inserts 61, 62 in the plane parallel with the surface of the transducer for emission and receipt of ultrasonic signals. In general, the cross-sectional shape of the transducers may be a closed convex curve with at least one axis of symmetry. In FIG. 6A, the cross-section of the transducer insert is circular 61, whereas in FIG. 6B, the cross-section of the transducer insert is oval 62. Other shapes such as elliptic, super-elliptic, lens shaped, etc. are envisioned. Normally, the transducer it-self is circular. A different cross-sectional shape than circular may nevertheless be chosen, e.g. for flow reasons, i.e. to provide a more aquadynamic shape of the transducer inserts.

Figure 7:
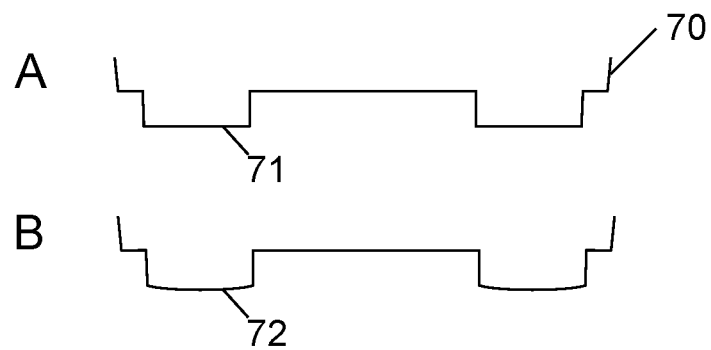
FIGS. 7 and 8 schematically illustrate cross-sectional shapes of the bottom of a cup similar to the cup of FIGS. 2 and 5.

FIG. 7 schematically illustrates cross-sectional shapes 70 of the bottom of a cup similar to the cup 50 of FIGS. 2 and 5 with the general cross-sectional shape of the transducer inserts in the plane perpendicular to the surface of the transducer for emission and receipt of ultrasonic signals.

In FIG. 7A the coupling surface is straight or flat, with a surface being parallel with the centre axis of the flow tube. In FIG. 7B the coupling surface curved towards the centre of the flow tube. The coupling surface is slightly convex pointing towards the centre axis. A straight coupling surface ensures that the ultrasonic path length through the coupling surface is the same along the entire surface, whereas a slightly convex coupling surface enhances the effect of removing bubbles from the signal paths. For a polymeric coupling surface, a slight convex shape does not influence the signal greatly. A slight convex shape is a curved surface with a height difference between the end of the surface and the centre of the surface of only a few millimeters, such as less than 2.5 mm, or even less than 1 mm, or even less than 0.5 mm.

Figure 8:
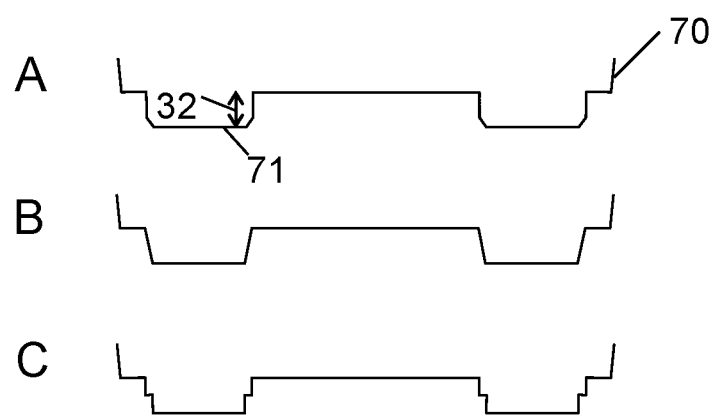

FIG. 8 illustrates cross-sectional shapes 70 similar to FIG. 7, however in embodiments wherein the cross-sectional shape changes along the depth 32 of the transducer insert.

In FIG. 8A, the side of the transducer insert is tapered at the top towards the coupling surface 71. In FIG. 8B, the side of the transducer insert is tapered along the entire depth. In FIG. 8C the side of the transducer insert is stepped. Steps may provide a seat for sealing means, such as an O-ring seat, cf. ref numeral 52 of FIG. 5. The steps may also relate to an overall cross-sectional change at a point. For example, the cross-sectional shape towards the bottom of the cup may be circular in order to provide an optimal seat for an O-ring, whereas the cross-sectional shape towards the centre of the flow tube may be oblong or lens shaped to provide an improved aquadymanic shape.

The shapes illustrated in FIGS. 6-8 are merely intended as examples of possible shapes, others and more shapes is possible within the scope of the invention. Moreover, the illustrated shapes and other shapes may be combined in any way within the scope of the invention.

The transducer insert shapes of FIGS. 6-8 are illustrated for the embodiment of FIGS. 2 and 5. Nevertheless, the same shape considerations are valid for the other embodiments, mutatis mutandis.

In the illustrated embodiments, two transducers forming a transducer pair are illustrated. In general more transducers, typically in pairs, may be present, such as four transducers, six transducer, etc. In the event of more than two transducers, two or more transducer inserts may be formed monolithically with the bottom of the housing in accordance with the embodiments of the present invention.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:
1. An ultrasonic flow meter arranged to measure a flow rate of a liquid, the flow meter comprises:

a through-going flow tube arranged for passage of a liquid between an inlet and an outlet, the flow tube defines a centre axis between the inlet and the outlet, the flow tube defines a flow passage either by an inner wall of the flow tube itself, by an inner wall of a measurement insert inserted into the flow tube or by a combination of the inner wall of the flow tube and a measurement insert;

a housing for liquid tight mounting on the flow tube, the housing comprises two or more ultrasonic transducers and a control circuit arranged for operating the transducers and for generating a signal or value indicative of the flow rate of the liquid;

each transducer comprises a surface for emission and receipt of ultrasonic signals, the surface defines a surface normal, and wherein the transducer is arranged so that the surface normal is perpendicular to the centre axis;

wherein the housing further comprises two or more separate transducer inserts formed monolithically with the housing as a part of the bottom of the housing, the two or more transducers being arranged in the transducer inserts, and wherein each transducer insert comprises a coupling surface formed monolithically with the transducer insert arranged in a plane parallel manner to cover the surface of the transducer; and wherein the housing is mounted on the flow tube so that the transducer inserts are inserted through separate matching openings in the flow tube to extend into the flow passage in a manner so that a distance between the centre axis and the coupling surface is smaller than a distance between the centre axis and a corresponding point on the inside cross-section of the inner wall so that gas bubbles in a liquid in the flow tube will not rest at the coupling surface.

2. The ultrasonic flow meter according to claim 1, wherein the distance between the centre axis and the coupling surface is at least 1 mm smaller than the distance between the centre axis and the corresponding point on the inside cross-section of the inner wall.

3. The ultrasonic flow meter according to claim 1, wherein the distance between the centre axis and the coupling surface is smaller than the distance between the centre axis and the inner wall in an extended region abutting and surrounding the edge of the openings in the flow tube, the extended region being at least 0.5 mm broad.

4. The ultrasonic flow meter according to claim 1, wherein the flow meter comprises a measurement insert for directing the ultrasonic signal from an emitting transducer through the flow tube to a receiving transducer, and wherein with the transducer insert mounted on the flow tube, the edge of at least one of the transducer inserts lock the measurement insert in at least one direction parallel with the centre axis.

5. The ultrasonic flow meter according to claim 1, wherein the cross-sectional shape of the transducer insert in a plane parallel with the surface of the transducer for emission and receipt of ultrasonic signals is a closed convex curve with at least one axis of symmetry.

6. The ultrasonic flow meter according to claim 1, wherein the cross-sectional shape of the coupling surface in a plane perpendicular to the surface of the transducer for emission and receipt of ultrasonic signals is parallel with the centre axis or is slightly convex.

7. The ultrasonic flow meter according to claim 1, wherein the cross-sectional shape of the transducer insert in a plane perpendicular to the surface of the transducer for emission and receipt of ultrasonic signals changes along the depth of the transducer insert.

8. The ultrasonic flow meter according to claim 1, wherein the housing is made from a polymer material.

9. The ultrasonic flow meter according to claim 1, wherein the housing is cast in a single process.

10. The ultrasonic flow meter according to claim 1, wherein the housing forms an enclosure with only a single opening.

11. The ultrasonic flow meter according to claim 10, wherein the housing together with a cover forms a water-tight enclosure with only a single seal positioned in the area between the housing and the cover.

12. The ultrasonic flow meter according to claim 1, where the flow meter is a water meter, a heat meter and/or a cooling meter.

* * * * *